Oct. 26, 1937.  M. E. H. PARKIN  2,097,290
ROLLER APPARATUS
Filed Jan. 7, 1937  2 Sheets-Sheet 1

Maurice Elwes Healey Parkin  INVENTOR

Oct. 26, 1937.    M. E. H. PARKIN    2,097,290
ROLLER APPARATUS
Filed Jan. 7, 1937    2 Sheets-Sheet 2

Maurice Elwes Healey Parkin, INVENTOR.

BY
ATTORNEY

Patented Oct. 26, 1937

2,097,290

UNITED STATES PATENT OFFICE 2,097,290

ROLLER APPARATUS

Maurice Elwes Healey Parkin, Chellows Park, Lingfield, England, assignor to Imperial Chemical Industries Limited, a corporation of Great Britain Application January 7, 1937, Serial No. 119,442
In Great Britain January 20, 1936

4 Claims. (Cl. 18—15)

This invention relates to an apparatus comprising a roller and, more particularly, to an apparatus whereby material can be carried on a roller and subjected to treatment in a continuous manner.

Heretofore, rotating rollers have been used in the manufacture of films of plastic material, a solution of the plastic being spread on a heated roller and the solvent being evaporated and a layer or film of solid plastic being formed as the roller rotates. The film or layer thus formed is removed by a knife blade bearing on the peripheral surface of the roller along its entire length so as to leave the surface clean when it passes under the liquid feed on the next revolution of the roller.

According to the amount of solvent to be evaporated, the time of contact of the material with the drum is controllable within limits by varying the speed of the latter. The possible variation may, however, be limited by the necessity of maintaining a continuous film of liquid on the surface and by the fact that at very low speeds the liquid tends to run off the drum instead of being carried round.

Also, plastic materials are commonly mixed or kneaded on a pair of mixing rolls which are usually heated. These rollers rotate in opposite directions, usually at different speeds to increase the mixing effect, on parallel axes set at such a distance as to leave a narrow space between the adjacent peripheral surfaces of the rollers. The plastic to be treated, such as cellulose derivative compositions, synthetic resins, rubber, and the like, is fed into the space between the rollers and, in most instances, is carried around on the surface of the faster moving roller. In the case of non-adherent plastics, subsidiary means may be employed, such as an endless belt, for keeping the plastic in contact with the roller. If sufficient mixing can be effected in less than a single revolution of the rollers, the plastic may be removed by a knife blade bearing on the roller along its entire length, thus permitting a continuous operation. Generally, a single revolution of the rollers is not sufficient so that it is necessary to feed plastic on the rollers in batches, allow it to be carried around for the desired length of time with the knife raised and then cutting the plastic off with the knife to leave the rollers clear for the next batch. This batch operation is obviously uneconomical and inconvenient.

An object of the present invention is to provide a roller apparatus for continuously working material when a single revolution of the roller or rollers is insufficient for the required heat treatment or mixing and so avoid the disadvantages pointed out above in connection with both the drying and kneading operations on the heretofore known apparatuses. Other objects of the invention will be apparent from the description given hereinafter.

The above objects are accomplished according to the present invention by means of an apparatus comprising a horizontally disposed roller, a plurality of baffle plates spaced along said rollers at right angles to the major axis thereof, each baffle plate having an arcuate section fitted closely to the peripheral surface of said roller to prevent material carried on said roller from moving laterally past said baffle plate, and a plurality of knives associated with the baffle plates, each knife being fitted closely to the peripheral surface of the roller and at an angle to its associated baffle plate with one end adjacent thereto, the angle of the knife with respect to its associated baffle plate and the direction in which the roller is to be rotated, being such that a strip of material carried by the roller between its associated baffle plate and the adjacent baffle plate on one side of it is separated by the knife and guided into the space between its baffle plate and the adjacent baffle plate on the other side.

When applied to a kneading or mixing operation, the apparatus will comprise a pair of adjacent, parallel, horizontally disposed rollers adapted to be rotated in opposite directions and one at a greater speed than the other, the baffle plates and associated knives cooperating with the faster moving roller which carries the plastic around.

By means of such apparatus, the plastic or liquid composition may be continuously fed on to the roller, or rollers, at one end, continuously advanced along same, and removed at the other end as will be more readily understood by reference to the drawings forming a part of this application wherein.

Figure 1:
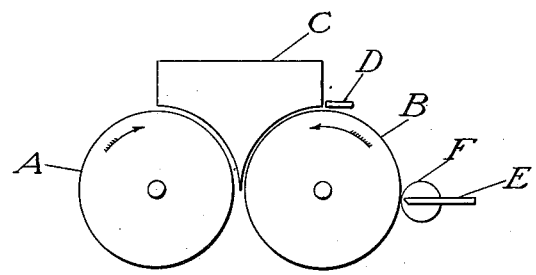
Fig. 1 is a diagrammatic end view of an apparatus comprising a pair of mixing rolls adapted to treat a plastic mass according to the present invention.
Figure 2:
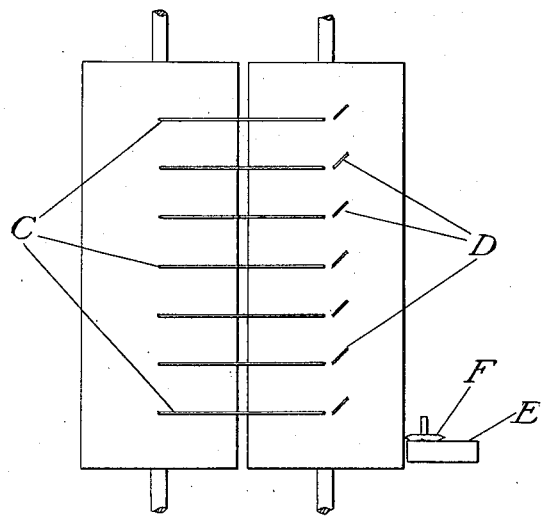
Fig. 2 is a top plan view of the apparatus shown in Fig. 1.
Figure 3:
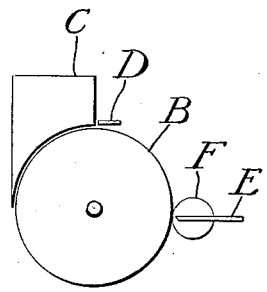
Figure 4:
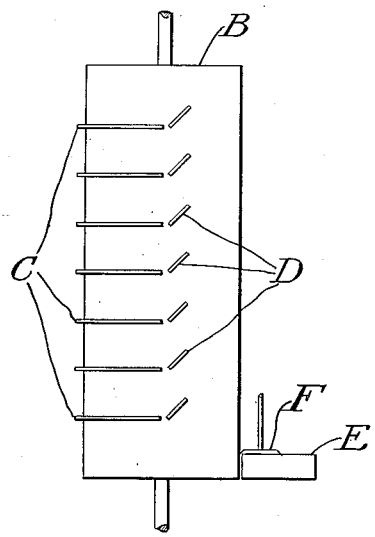

Fig. 3 is a diagrammatic end view of an apparatus using only a single roller; and Fig. 4 is a top plan view of the apparatus shown in Fig. 3, In Figs. 1 and 2, A and B are two rollers, usually provided with internal heating means, adapted to be rotated in opposite directions as indicated by the arrows in Fig. 1, roller B being rotated at the greater speed. For example, in working a phenol-formaldehyde resin mixture a suitable peripheral speed for roller A would be 50 feet per minute and, for roller B 75 feet per minute.

Along the length of the rollers are disposed at intervals baffle plates C, each baffle plate having a pair of concave arcuate sections fitted closely to the peripheral surfaces of the rollers A and B to prevent material carried on the rollers from moving laterally. It is particularly important to have the baffle plates fitting closely to the peripheral surface of roller B which carries the plastic around. Each baffle plate C has a knife D associated with it, the knife being fitted closely to the peripheral surface of the faster moving roller B and at an angle to its associated baffle plate C and with one end adjacent to its associated baffle plate C.

The angle of each knife D with respect to its associated baffle plate C and the direction in which the roller B is to be rotated, are such that a strip of the material carried by the roller B between any two baffle plates is separated by the knife and guided into the space formed by one of the two baffle plates and the baffle plate on its other side.

Referring to Fig. 2, the plastic material would be fed on to the rollers at the end shown uppermost and, as the roller B carried the plastic around, a strip of the plastic would be separated by the first knife and guided into the space formed between the first and second baffle plates. After sufficient plastic accumulated in that space to spread over it, normally a single revolution of the roller B would effect this, the second knife would then begin to separate a strip of plastic and guide it into the next space formed by the baffle plates and, in that way, the plastic would gradually work to the opposite end of the rollers.

To remove the plastic from the roller B, a stripping knife E and a rotating knife F, both bearing against the peripheral surface of roller B are provided at the opposite end of the rollers from that at which the plastic is fed on to them. As the plastic works toward this end of the rollers, it is continuously stripped off by the knife E, facilitated by the shearing action of knife F.

It will be understood that the apparatus shown in the drawings simply illustrates diagrammatically one particular embodiment of an apparatus according to the present invention. It will be apparent that the plastic material could be continuously fed at the center and removed at the two ends of the rollers by suitably adjusting the angle of the knives. Likewise, the angle of the knives and their length govern the width of the strip continuously fed from one space formed by the baffle plates to the next and this can be adjusted to subject the plastic material to the required time of kneading without altering the speed of the rollers.

In Figs. 3 and 4 is illustrated an apparatus similar to that shown in Figs. 1 and 2 except that only one roller B is used, said roller B adapted to rotate in a counter-clockwise direction when viewed as in Fig. 3. In this type of apparatus the baffle plates C are modified to eliminate one of the arcuate sections. The liquid or plastic composition to be kneaded and dried is fed on to the roller B at the end which is uppermost in Fig. 4 and is carried around the roller until it meets with the first of the knives D. This knife diverts the composition into the space between the first two baffles C. Each of the knives D and baffles C following will have a similar effect in working the composition, as it dries, from one end of the heated roller B to the other until the composition is finally stripped off by the knives E and F in the same manner as in the apparatus shown in Figs. 1 and 2.

An advantage of the present invention is that the time any material is treated on the roller, or rollers, can be varied at will without altering the peripheral speed of the rollers, merely by adjusting the angle of the knives D to separate a narrow or wide strip of material and move it laterally along the roller. In this manner, a means is provided for working materials on a roller, or rollers, continuously, where heretofore a continuous process in many instances had been impossible because of the fact that the roller, or rollers, had to be rotated at a certain speed which did not permit a sufficient time for treating the material. It will be understood that where a solution is sprayed on to a single roller, a definite minimum speed must be maintained in order to keep a film on the roller and, in the case of mixing rollers, a minimum speed must also be maintained to effect the proper kneading or mixing action.

The present invention provides a simple and economical apparatus which can be used in an entirely continuous manner simply by feeding the material to be treated at one end of the roller, or rollers, and removing it at the other, without adding any complicated moving part to apparatuses heretofore used for this purpose and without materially increasing the cost of the apparatus. The advantages to be gained from an apparatus adapted to allow a continuous process to be used at all times without any substantial increase in equipment costs, are obvious to those skilled in the art.

As many apparently widely different embodiments of this invention may be made without departing from the spirit and scope thereof, it is to be understood that the invention is not limited to the specific embodiments thereof except as defined in the appended claims.

I claim:

1. An apparatus comprising a horizontally disposed roller, a plurality of baffle plates spaced along said roller at right angles to the major axis thereof, each baffle plate having an arcuate section fitted closely to the peripheral surface of said roller to prevent material carried on said roller from moving laterally past said baffle plate, and a plurality of knives associated with said baffle plates, each knife being fitted closely to the peripheral surface of said roller and at an angle to its associated baffle plate with one end adjacent thereto, the angle of the knife with respect to its associated baffle plate and the direction in which the roller is to be rotated, being such that a strip of the material carried by said roller between said baffle plate and the adjacent baffle plate on one side thereof is separated by said knife and guided into the space between said baffle plate and the adjacent baffle plate on the other side thereof.

2. An apparatus comprising a horizontally disposed roller, a plurality of baffle plates spaced along said roller at right angles to the major axis thereof, each baffle plate having an arcuate section fitted closely to the peripheral surface of said roller to prevent material carried on said roller from moving laterally past said baffle plate, a plurality of knives associated with said baffle plates, each knife being fitted closely to the peripheral surface of said roller and at an angle to its associated baffle plate with one end adjacent thereto, the angle of the knife with respect to its associated baffle plate and the direction in which the roller is to be rotated, being such that a strip of the material carried by said roller between said baffle plate and the adjacent baffle plate on one side thereof is separated by said knife and guided into the space between said baffle plate and the adjacent baffle plate on the other side thereof, and stripping means adjacent the end of said roller toward which the material tends to work, for continuously removing a strip of the material.

3. An apparatus comprising a pair of rollers disposed horizontally, parallel to each other, and with their peripheral surfaces adjacent each other, said rollers being adapted to be rotated in opposite directions and one at a greater peripheral speed than the other, a plurality of baffle plates above and spaced along said rollers at right angles to the major axes thereof, each baffle plate having two arcuate sections fitted closely to the peripheral surfaces of said rollers and extending down and at least part way between said rollers to prevent material carried on said faster moving roller from moving laterally past said baffle plate, and a plurality of knives associated with said baffle plates, each knife being fitted closely to the peripheral surface of said faster moving roller and at an angle to its associated baffle plate with one end adjacent thereto, the angle of the knife with respect to its associated baffle plate and the direction in which the faster moving roller is to be rotated, being such that a strip of the material carried by said faster moving roller between said baffle plate and the adjacent baffle plate on one side thereof is separated by said knife and guided into the space between said baffle plate and the adjacent baffle plate on the other side thereof.

4. An apparatus comprising a pair of rollers disposed horizontally, parallel to each other, and with their peripheral surfaces adjacent each other, said rollers being adapted to be rotated in opposite directions and one at a greater peripheral speed than the other, a plurality of baffle plates above and spaced along said rollers at right angles to the major axes thereof, each baffle plate having two arcuate sections fitted closely to the peripheral surfaces of said rollers and extending down and at least part way between said rollers to prevent material carried on said faster moving roller from moving laterally past said baffle plate, a plurality of knives associated with said baffle plates, each knife being fitted closely to the peripheral surface of said faster moving roller and at an angle to its associated baffle plate with one end adjacent thereto, the angle of the knife with respect to its associated baffle plate and the direction in which the faster moving roller is to be rotated, being such that a strip of the material carried by said faster moving roller between said baffle plate and the adjacent baffle plate on one side thereof is separated by said knife and guided into the space between said baffle plate and the adjacent baffle plate on the other side thereof, and stripping means adjacent the end of said faster moving roller toward which the material tends to work, for continuously removing a strip of the material.

MAURICE ELWES HEALEY PARKIN.